(12) United States Patent
Koo et al.

(10) Patent No.: US 8,267,319 B2
(45) Date of Patent: Sep. 18, 2012

(54) ANTENNA, AND RADIO FREQUENCY IDENTIFYING DEVICE AND METHOD

(75) Inventors: Hoon Young Koo, Seoul (KR); Jae Gwan Song, Daejeon (KR); Young Gon Kim, Daejeon (KR); Hong Suk Hu, Daejeon (KR); Jong Heung Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 295 days.

(21) Appl. No.: 12/688,282

(22) Filed: Jan. 15, 2010

(65) Prior Publication Data

US 2011/0057038 A1    Mar. 10, 2011

(30) Foreign Application Priority Data

Sep. 9, 2009    (KR) .................. 10-2009-0085056

(51) Int. Cl.
*G06K 7/08* (2006.01)
*G06K 7/04* (2006.01)
*G06K 7/00* (2006.01)
*G06K 19/00* (2006.01)
*G06K 7/10* (2006.01)
*G06F 19/00* (2011.01)
*H04Q 5/22* (2006.01)
*G08B 13/14* (2006.01)
*H01Q 3/00* (2006.01)
*H01Q 3/12* (2006.01)

(52) U.S. Cl. ........ 235/451; 235/435; 235/487; 235/444; 235/385; 235/472.02; 340/10.1; 340/572.1; 343/757; 343/766

(58) Field of Classification Search .................. 235/385, 235/435, 451, 444, 472.02, 487; 340/10.1, 340/572.1; 343/757, 766
See application file for complete search history.

(56) References Cited

U.S. PATENT DOCUMENTS

| | | | |
|---|---|---|---|
| 5,835,010 A * | 11/1998 | Asakura et al. | 340/505 |
| 7,155,304 B1 * | 12/2006 | Charych | 700/214 |
| 7,561,050 B2 * | 7/2009 | Bhogal et al. | 340/572.4 |
| 7,755,488 B2 * | 7/2010 | Dvorsky | 340/572.1 |
| 8,102,243 B2 * | 1/2012 | Horne et al. | 340/10.1 |
| 2005/0116034 A1 * | 6/2005 | Satake et al. | 235/432 |
| 2006/0244595 A1 * | 11/2006 | Malone et al. | 340/572.1 |
| 2008/0297350 A1 * | 12/2008 | Iwasa et al. | 340/572.1 |
| 2008/0303669 A1 * | 12/2008 | Lazo | 340/572.1 |
| 2009/0002237 A1 * | 1/2009 | Nonoyama | 342/450 |
| 2009/0079578 A1 * | 3/2009 | Dvorsky | 340/604 |
| 2009/0152364 A1 * | 6/2009 | Spivey, Jr. | 235/492 |
| 2009/0174556 A1 * | 7/2009 | Horne et al. | 340/572.3 |
| 2009/0233735 A1 * | 9/2009 | Savarese et al. | 473/407 |
| 2009/0256672 A1 * | 10/2009 | Yamamoto et al. | 340/5.2 |
| 2010/0075619 A1 * | 3/2010 | Solla et al. | 455/90.3 |
| 2010/0176922 A1 * | 7/2010 | Schwab et al. | 340/10.1 |
| 2010/0191159 A1 * | 7/2010 | Ellin | 601/58 |
| 2010/0271182 A1 * | 10/2010 | Yashukova | 340/10.1 |
| 2010/0273469 A1 * | 10/2010 | Seban et al. | 455/418 |
| 2011/0199188 A1 * | 8/2011 | Dickson | 340/10.1 |

FOREIGN PATENT DOCUMENTS

KR    10-2006-0089562    8/2006

\* cited by examiner

*Primary Examiner* — Daniel Walsh
(74) *Attorney, Agent, or Firm* — Staas & Halsey LLP (57) ABSTRACT

A radio frequency identifying device minimizes a null point area within a radiation pattern by horizontally or vertically vibrating an antenna plate radiating a radio frequency beam by using at least one vibration motor.

14 Claims, 8 Drawing Sheets

ANTENNA, AND RADIO FREQUENCY IDENTIFYING DEVICE AND METHOD

CROSS-REFERENCE TO RELATED APPLICATION

This application claims priority to and the benefit of Korean Patent Application No. 10-2009-0085056 filed in the Korean Intellectual Property Office on Sep. 9, 2009, the entire contents of which are incorporated herein by reference.

BACKGROUND OF THE INVENTION (a) Field of the Invention

The present invention relates to an antenna, a radio frequency identifying device, and a radio frequency identifying method.

(b) Description of the Related Art

When attempting to identify a plurality of radio frequency identification tags, a conventional radio frequency identifying device including a fixed antenna, that is, a radio frequency identifying reader, cannot identify the unidentified radio frequency identification tags even if it stays a long time within the identification range of the antenna because interference or a null point is generated between the RF identity readers and the tags.

Therefore, in order to identify a plurality of moving objects to which an RF identity tag is attached, a method for shaking or rotating the target object is used to gain a sufficient identity rate. The method is used to satisfy the sufficient condition for the tag to sufficiently absorb the electromagnetic waves of the RF ID reader antenna.

However, the method for directly moving the target object requires much cost and makes the flow of goods slow.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a radio frequency identifying device and method for increasing identification performance of a radio frequency identification tag.

An exemplary embodiment of the present invention provides a radio frequency identifying device including: a sensor for sensing whether there is an identification object within a predetermined area; an antenna including an antenna plate and a vibration motor, and vibrating the antenna plate by using the vibration motor and radiating a radio frequency beam by using the antenna plate; and a controller for controlling the vibration motor and the antenna plate to vibrate the antenna plate and radiate the radio frequency beam when the identification object is sensed by the sensor.

Another embodiment of the present invention provides an antenna of a radio frequency identifying device including: an antenna plate for radiating a radio frequency beam; a vibration motor for generating vibration for moving the antenna plate; and a vibration plate for transmitting the vibration to the antenna plate.

Yet another embodiment of the present invention provides a radio frequency identifying method of a radio frequency identifying device including: generating vibration horizontally or vertically by using a vibration motor; generating a radio frequency beam while moving an antenna plate according to the vibration; and receiving data from a radio frequency identification tag having received the radio frequency beam.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements.

A conventional method for a radio frequency identifying device to identify a radio frequency identification tag attached to an identification object will now be described.

Figure 1:
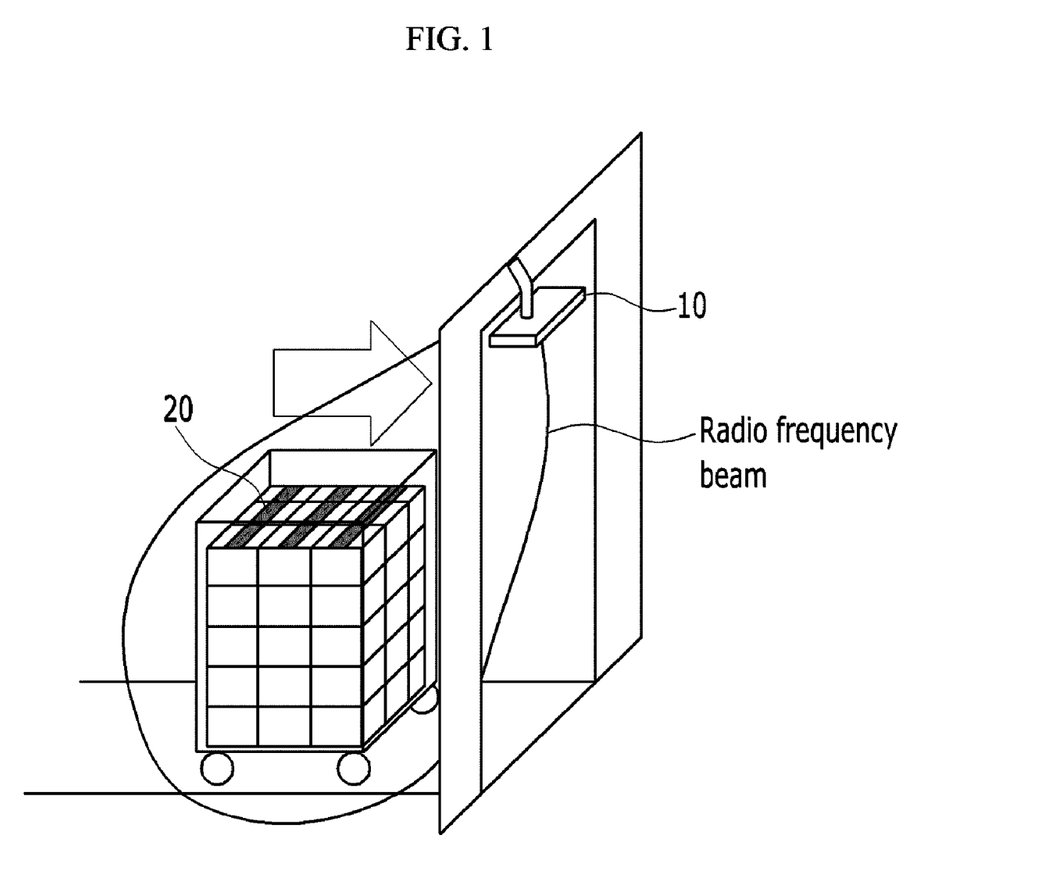
FIG. 1 shows an example for a conventional radio frequency identifying device to identify a radio frequency identification tag attached to an identification object.
Figure 2:
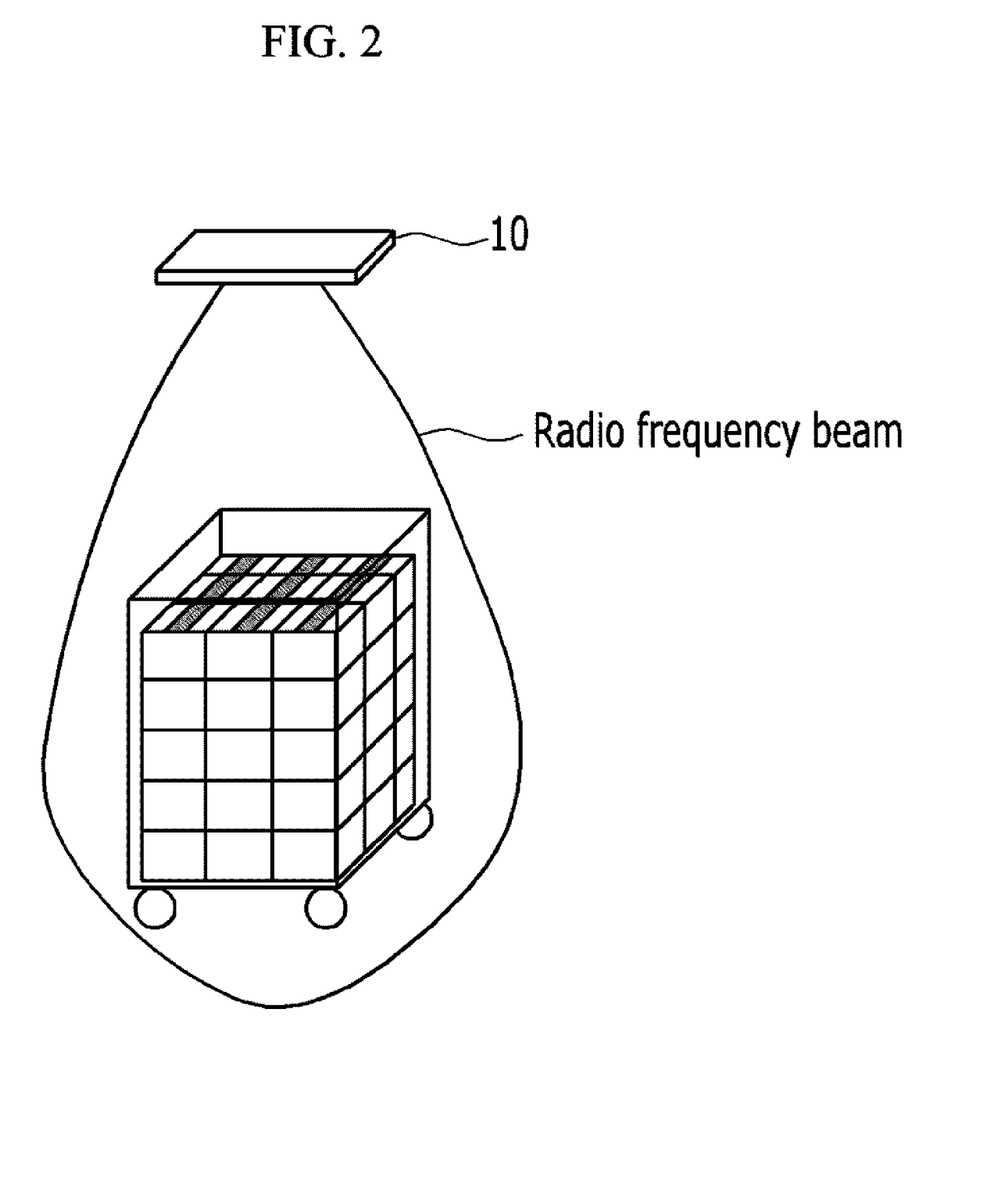
FIG. 2 and FIG. 3 show a conventional example of a radiation pattern of a radio frequency identifying device.
Figure 3:
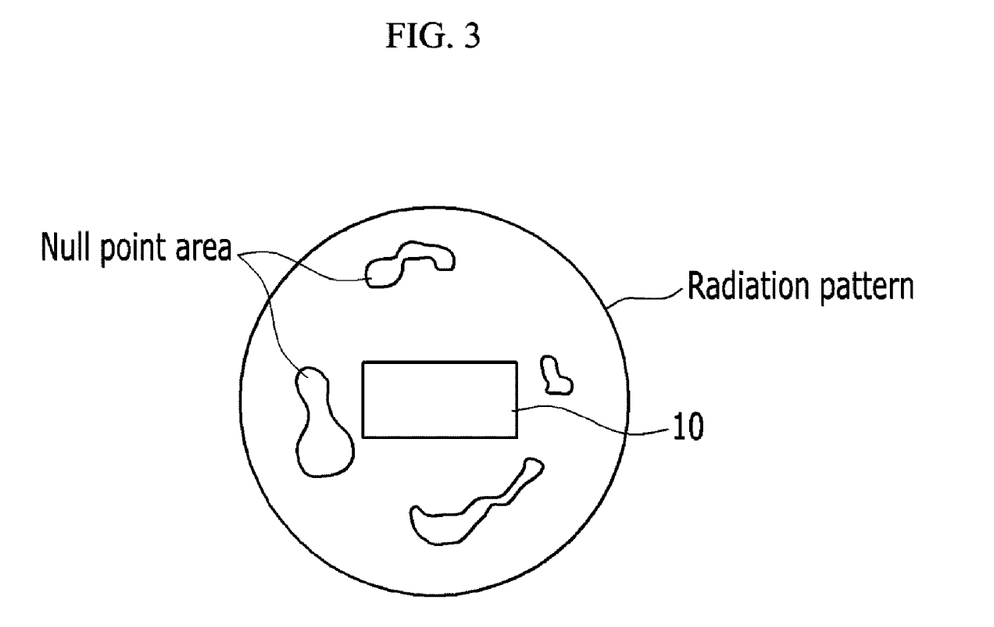

FIG. 1 shows an example for a conventional radio frequency identifying device to identify a radio frequency identification tag attached to an identity target, and FIG. 2 and FIG. 3 show a conventional example of a radiation pattern of a radio frequency identifying device.

Referring to FIG. 1, a radio frequency identification tag 20 attached to an identification object such as a pallet is identifiable by the radio frequency identifying device within the range of the radio frequency beam radiated by the antenna 10 of the radio frequency identifying device.

The radiation pattern of the radio frequency beam radiated through the antenna 10 of the radio frequency identifying device shows the symmetric radiation pattern in the ultrahigh frequency bandwidth while the antenna 10 is fixed as shown in FIG. 2. When the radio frequency beam is radiated while the antenna 10 is fixed as shown in FIG. 2, a null point may be generated as shown in FIG. 3. The null point area is positioned in the radiation pattern of the radio frequency identifying device but fails to sufficiently absorb the radio frequency beam, and radio frequency identification tag provided in the null point area may not be identified by the radio frequency identifying device.

Therefore, a method for eliminating the null point area is needed so as to efficiently identify the radio frequency identification tag.

A radio frequency identifying device and method according to an exemplary embodiment of the present invention will now be described with reference to accompanying drawings.

Figure 4:
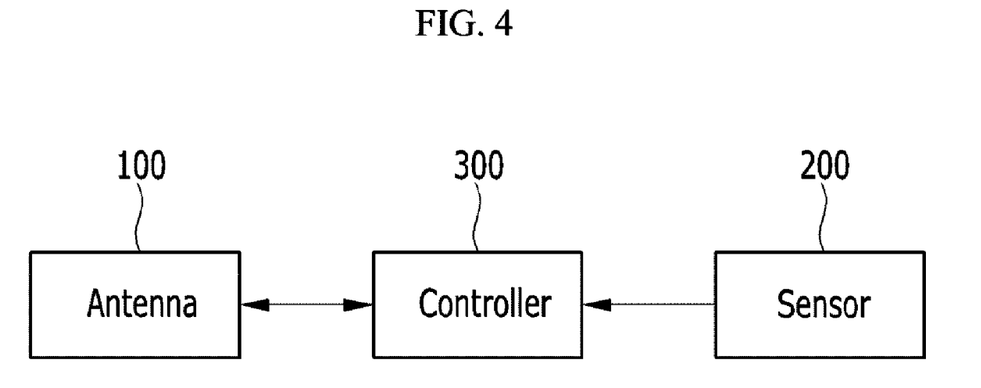
FIG. 4 shows a configuration diagram of a radio frequency identifying device according to an exemplary embodiment of the present invention.

FIG. 4 shows a configuration diagram of a radio frequency identifying device according to an exemplary embodiment of the present invention.

Referring to FIG. 4, the radio frequency identifying device includes an antenna 100, a sensor 200, and a controller 300.

The antenna 100 radiates a radio frequency beam based on an input control signal, and receives data from a radio frequency identification tag of the identification object having received the radio frequency beam. The antenna 100 includes an antenna plate (not shown) and at least one vibration motor (not shown), and vibrates the antenna plate in the horizontal or vertical direction by using the vibration motor.

The sensor 200 includes an operational sensor (not shown), and senses whether there is an identification object within a predetermined area. In this instance, the sensors included in the sensor 200 may be changed depending on the identification object.

When the identification object is sensed by the sensor 200, the controller 300 controls the antenna plate included in the antenna 100 to radiate the radio frequency beam by using a control signal.

The controller 300 vibrates the antenna plate by driving the vibration motor by use of the control signal, and checks the corresponding identification object based on the data that are acquired from the radio frequency identification tag through the antenna 100.

Figure 5:
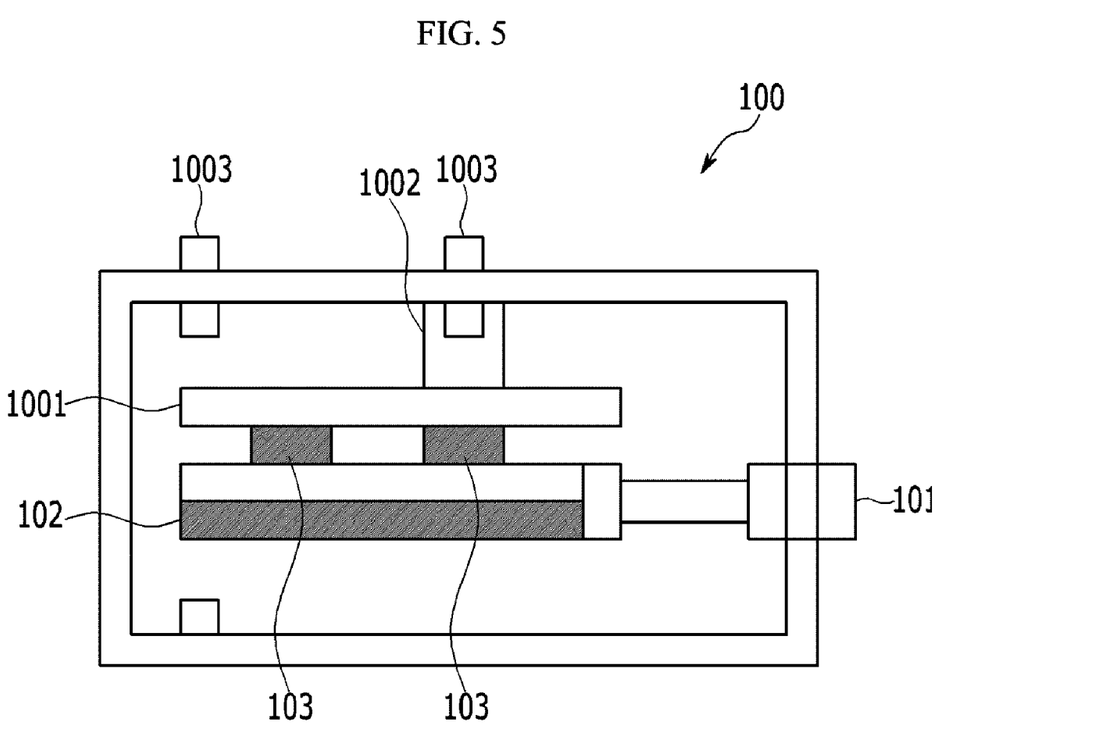
FIG. 5 shows a side of an antenna according to an exemplary embodiment of the present invention.
Figure 6:
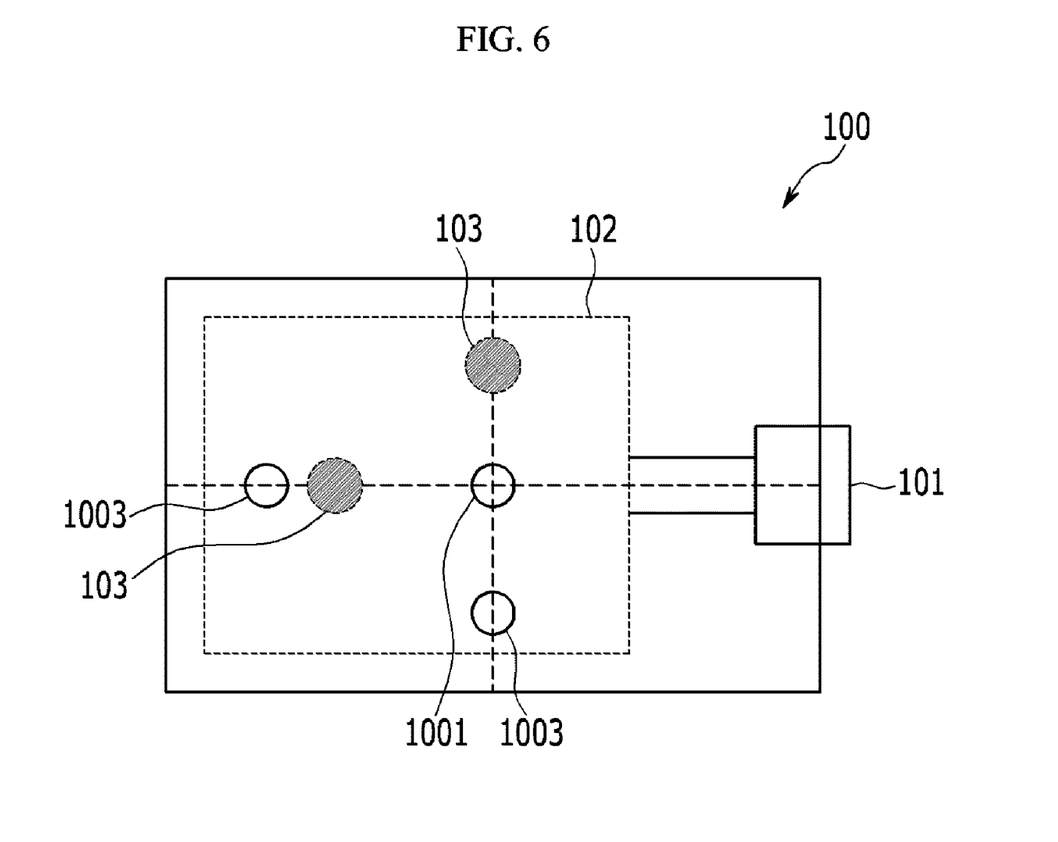
FIG. 6 shows a top of an antenna according to an exemplary embodiment of the present invention.

FIG. 5 shows a side of an antenna according to an exemplary embodiment of the present invention, and FIG. 6 shows the top of an antenna according to an exemplary embodiment of the present invention.

Referring to FIG. 5, the antenna 100 includes an interface 101, an antenna plate 102, at least one vibration motor 103, and a structure package.

The interface 101 is realized as a connector, transmits the control signal input by the controller 300 to the vibration motor 103, and transmits the data that are acquired from the radio frequency identification tag of the identification object through the antenna plate 102 to the controller 300.

The antenna plate 102 radiates the radio frequency beam based on the control signal input by the controller 300, and receives data from the radio frequency identification tag having received it.

The vibration motor 103 generates vibration for moving the antenna plate 102 in the horizontal or vertical direction based on the control signal input by the controller 300.

The structure package includes a vibration plate 1001, a vibration plate support 1002, and a vibration support plate 1003, and supports the vibration motor 103 and transmits vibration of the vibration motor 103 to the antenna plate 102.

The vibration plate 1001 transmits the vibration generated by the vibration motor 103 to the antenna plate 102.

The vibration plate support 1002 is a material of predetermined hardness and elasticity, and when vibration by the vibration motor 103 is stopped, it restores the states of the antenna plate 102 and the vibration plate 1001 to the states of before vibration is applied.

The vibration support plate 1003 has a variable length or position, and controls the vibration range of the vibration plate 1001. Therefore, the user can control the vibration range of the vibration plate 1001 by varying the length or position of the vibration support plate 1003. That is, the vibration range of the antenna plate 102 can be controlled by varying the position or length of the vibration support plate 1003.

In the exemplary embodiment of the present invention, as shown in FIG. 5 and FIG. 6, two vibration motors 103 are used to randomly vibrate the antenna plate 102. In this case, one vibration motor 103 generates vibration in the horizontal direction and the other vibration motor 103 generates vibration in the vertical direction. Also, in order to guarantee random vibration in the exemplary embodiment of the present invention, the vibration motors 103 having the same number of vibrations occurring in the same time frame and having a non-synchronized vibration generating time, or the vibration motors 103 having a different number of vibrations occurring in the same time frame can be used.

The case in which the antenna plate 102 is moved by using two vibration motors 103 will be described in the exemplary embodiment of the present invention, and the present invention is also applicable to the case of using at least one vibration motor 103.

Referring to FIG. 5 and FIG. 6, the vibration motor 103 and the vibration support plate 1003 are provided in opposite directions of the interface 101 of the connector type to control the vibration in the horizontal direction generated by the vibration motor 103, and in addition, the vibration motor 103 and the vibration support plate 1003 are positioned in opposite directions to control vibration in the vertical direction.

Figure 7:
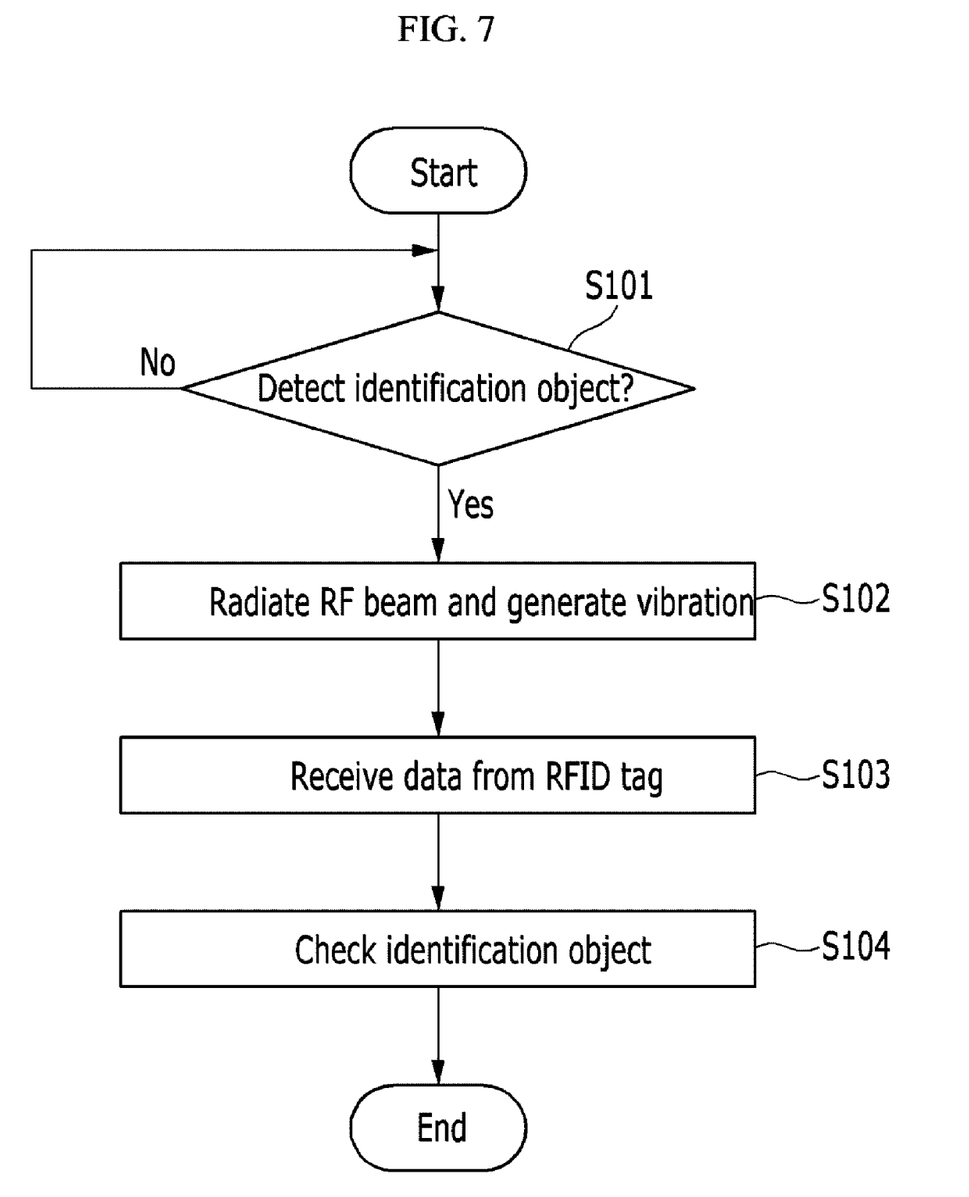
FIG. 7 shows a flowchart of a radio frequency identifying method by a radio frequency identifying device according to an exemplary embodiment of the present invention.
Figure 8:
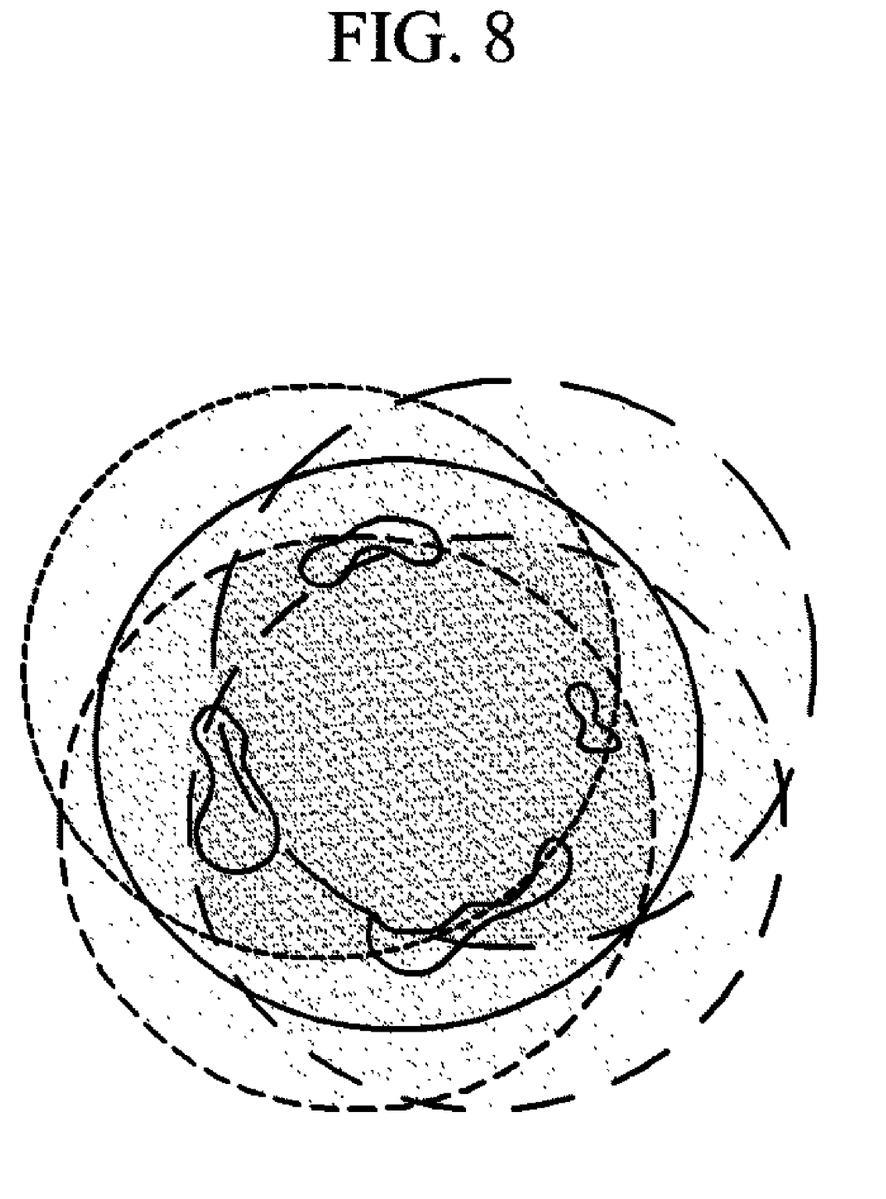
FIG. 8 shows a radio frequency beam radiation pattern of a radio frequency identifying device according to an exemplary embodiment of the present invention.

FIG. 7 shows a flowchart of a radio frequency identifying method by a radio frequency identifying device according to an exemplary embodiment of the present invention, and FIG. 8 shows a radio frequency beam radiation pattern of a radio frequency identifying device according to an exemplary embodiment of the present invention.

Referring to FIG. 7, the radio frequency identifying device senses whether there is an identification object positioned within the identification range of the radio frequency identifying device through the sensor 200 (S101), and when an identification object is sensed within the identification range, it radiates the radio frequency beam through the controller 300 and generates a control signal for vibrating the antenna plate 102. Therefore, the antenna 100 having received the control signal generates vibration through the vibration motor 103 to vibrate the antenna plate 102 in the horizontal or vertical direction, and radiates the radio frequency beam by using the antenna plate 102 (S102).

The radio frequency identifying device receives data from the radio frequency identification tag having received the radio frequency beam (S103), and checks the identification object by acquiring information on the corresponding identification object (S104).

As described above, the null point area in the radiation pattern can be minimized as shown in FIG. 8 by vibrating the antenna plate 102 in the horizontal or vertical direction in the exemplary embodiment of the present invention. Accordingly, the identification rate for the radio frequency identification tag attached to the identification object that randomly moves can be improved. Also, the identification rate can be improved with a low cost by using at least one vibration motor 103 so as to vibrate the antenna plate 102.

In addition, power consumption can be minimized by radiating the radio frequency beam and vibrating the antenna plate when the identification object is sensed.

According to an embodiment of the present invention, the identification rate for the radio frequency identification tag attached to the identification object that moves and passes in the random manner is increased.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A radio frequency identifying device comprising: a radio frequency sensor for sensing whether there is an radio frequency tagged identification object within a predetermined area; an antenna device comprising an antenna operably connected to both an antenna plate and a vibration motor, and a controller controlling the vibration motor and the antenna plate, wherein the controller, upon the identification object being sensed by the sensor, controls the vibration motor to physically vibrate the antenna plate along at least one axis while radiating a radio frequency radiation pattern to the radio frequency tagged object to create a vibrated radio frequency radiation pattern, and wherein said vibrated radio frequency radiation pattern has reduced null zones than said radiated radio frequency radiation pattern that was not vibrated.

2. The radio frequency identifying device of claim 1, wherein
the antenna includes:
an interface for receiving a control signal from the controller;
the vibration motor for generating vibration for moving the antenna plate horizontally or vertically based on the control signal; and
the antenna plate for radiating the radio frequency beam based on the control signal.

3. The radio frequency identifying device of claim 2, wherein
the antenna further includes:
a vibration plate for transferring the vibration to the antenna plate;
a vibration plate support for restoring the antenna plate and the vibration plate to their original states of before vibration is generated, when the vibration stops; and
a vibration support plate for controlling a vibration range of the vibration plate.

4. The radio frequency identifying device of claim 3, wherein
the vibration plate support is made of a material with predetermined hardness and elasticity.

5. The radio frequency identifying device of claim 3, wherein
the length or position of the vibration support plate is variable, and the vibration range of the antenna plate is controlled by the length or position of the vibration support plate.

6. The radio frequency identifying device of claim 2, wherein
the antenna includes a plurality of vibration motors having the same number of vibrations occurring within the same time and having different times of generation of vibration.

7. The radio frequency identifying device of claim 2, wherein
the antenna includes a plurality of vibration motors having different numbers of vibrations occurring within the same time.

8. The radio frequency identifying device of claim 1, wherein
the antenna includes:
a first vibration motor for generating vibration for moving the antenna plate horizontally; and
a second vibration motor for generating vibration for moving the antenna plate vertically.

9. An antenna device of a radio frequency identifying device, comprising:
an antenna plate operable to radiate a radio frequency radiation pattern; a vibration motor operable to generate vibration along at least one axis, said vibration vibrating the antenna plate while said radio frequency radiation pattern is being radiated; a vibration plate operable to transmit the vibration to the antenna plate, wherein the vibrated radio frequency radiation pattern is radiated when a radio frequency sensor senses the presence of a radio frequency tagged identification object within a predetermined range; and wherein the vibrated radio frequency radiation pattern has reduced null zones than said radiated radio frequency radiation pattern that was not vibrated.

10. The antenna of claim 9, further including
a vibration plate support for restoring the antenna plate and the vibration plate to their original states of before vibration is generated, when the vibration is stopped; and
a vibration support plate for controlling the vibration range of the vibration plate.

11. The antenna of claim 9, wherein
the antenna plate radiates the radio frequency beam when there is an identification object sensed within a predetermined range.

12. A radio frequency identifying method of a radio frequency identifying device, comprising:
generating vibration horizontally or vertically using a vibration motor when a radio frequency tagged identification object is sensed within a predetermined range by a radio frequency sensor; sensing by a radio frequency sensor, a radio frequency tagged identification object, and upon said sensing, generating a radio frequency radiation pattern while vibrating an antenna plate according to said vibration to form a vibrated radio frequency radiation pattern having less null zones than said radio frequency identification pattern; receiving data from a read radio frequency identification tag having received the vibrated radio frequency pattern.

13. The radio frequency identifying method of claim 12, further including
sensing whether there is the identification object within a predetermined range by using the sensor.

14. The radio frequency identifying method of claim 12, wherein
the radiating includes
radiating the radio frequency beam when the identification object is sensed by the sensor.

* * * * *